United States Patent
Woo et al.

(10) Patent No.: US 11,228,238 B2
(45) Date of Patent: Jan. 18, 2022

(54) CHARGING APPARATUS CAPABLE OF REDUCING LOW-FREQUENCY LEAKAGE CURRENT

(71) Applicants: Hyundai Motor Company, Seoul (KR); Kia Motors Corporation, Seoul (KR)

(72) Inventors: Dong Gyun Woo, Suwon-Si (KR); Gyu Tae Choi, Suwon-Si (KR); Hui Sung Jang, Hwaseong-Si (KR); Hyun Wook Seong, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 303 days.

(21) Appl. No.: 16/520,075

(22) Filed: Jul. 23, 2019

(65) Prior Publication Data

US 2020/0195129 A1 Jun. 18, 2020

(30) Foreign Application Priority Data

Dec. 12, 2018 (KR) .......................... 10-2018-0160158

(51) Int. Cl.
*H02M 1/42* (2007.01)
*H02J 7/02* (2016.01)
(Continued)

(52) U.S. Cl.
CPC ........... *H02M 1/4208* (2013.01); *B60L 53/20* (2019.02); *H02J 7/022* (2013.01); *H02M 1/088* (2013.01); *B60L 2210/10* (2013.01)

(58) Field of Classification Search
None
See application file for complete search history.

(56) References Cited

U.S. PATENT DOCUMENTS

| 6,930,293 B2 | 8/2005 | Matsuo et al. |
| 10,205,401 B1 | 2/2019 | Nikitin |

(Continued)

FOREIGN PATENT DOCUMENTS

| JP | 2010-119188 A | 5/2010 |
| JP | 2017-069996 A | 4/2017 |

(Continued)

*Primary Examiner* — Jared Fureman
*Assistant Examiner* — Aqeel H Bukhari
(74) *Attorney, Agent, or Firm* — Morgan, Lewis & Bockius LLP (57) ABSTRACT

A charging apparatus may include a power factor correction converter including a switching element, to correct a power factor of AC power provided by external charging equipment through ON/OFF control of the switching element, to convert the corrected power factor into DC power, and to output the DC power; a DC link capacitor connected to both ends of the PFC converter to form a DC voltage; a DC-DC converter converting a magnitude of the DC voltage formed by the DC link capacitor into a magnitude of a voltage required by an energy storage device to be charged; and a duty controller configured to determine a duty of the switching element in the PFC converter based on a magnitude of a common-mode component of an AC voltage of the AC power provided by the external charging equipment and the magnitude of the DC voltage formed by the DC link capacitor.

9 Claims, 5 Drawing Sheets

(51) Int. Cl.
  *B60L 53/20*    (2019.01)
  *H02M 1/088*    (2006.01)

(56) References Cited

U.S. PATENT DOCUMENTS

| | | | |
|---|---|---|---|
| 2002/0172056 A1* | 11/2002 | Riggio | H02M 3/33569 |
| | | | 363/24 |
| 2006/0226707 A1 | 10/2006 | Mount et al. | |
| 2007/0127275 A1 | 6/2007 | Chuang et al. | |
| 2011/0149606 A1 | 6/2011 | Ho et al. | |
| 2012/0007512 A1* | 1/2012 | Kim | H05B 45/35 |
| | | | 315/152 |
| 2012/0194141 A1 | 8/2012 | Shi et al. | |
| 2013/0249469 A1 | 9/2013 | Pahlevaninezhad et al. | |
| 2014/0313795 A1 | 10/2014 | Mi et al. | |
| 2014/0361628 A1 | 12/2014 | Huang et al. | |
| 2018/0054140 A1 | 2/2018 | Chen et al. | |
| 2019/0006952 A1 | 1/2019 | Takahara et al. | |
| 2019/0291585 A1 | 9/2019 | Yang et al. | |
| 2019/0341847 A1 | 11/2019 | Yuzurihara et al. | |

FOREIGN PATENT DOCUMENTS

| | | |
|---|---|---|
| JP | 2017-163764 A | 9/2017 |
| KR | 10-2014-0114175 A | 9/2014 |
| KR | 10-2016-0013551 A | 2/2016 |

\* cited by examiner

CHARGING APPARATUS CAPABLE OF REDUCING LOW-FREQUENCY LEAKAGE CURRENT

CROSS REFERENCE TO RELATED APPLICATION

The present application claims priority of Korean Patent Application No. 10-2018-0160158 filed on Dec. 12, 2018, the entire contents of which is incorporated herein for all purposes by this reference.

BACKGROUND OF THE INVENTION

Field of the Invention

The present invention relates to a charging apparatus for charging an energy storage device, and more particularly, to a charging apparatus capable of reducing a low-frequency leakage current due to a common-mode component included in various types of alternating-current (AC) system power regardless of the type of the AC system power.

Description of Related Art

Generally, an electric vehicle or a plug-in hybrid vehicle includes an energy storage device (for example, a battery) for receiving and storing alternating current (AC) system power using charging equipment. To charge the energy storage device, the vehicle includes a charging apparatus configured for converting AC system power provided by external charging equipment into direct current (DC) power of a desired magnitude.

The charging apparatus mounted in the vehicle is called an on-board charger (OBC). The charging apparatus includes a power factor correction converter for generating a DC voltage by correcting the power factor of input AC power and a DC-DC converter for converting the magnitude of the output voltage of the power factor correction converter into the magnitude of a voltage required for battery charging. Also, a Y-capacitor is provided at input and output terminals of the vehicle-mounted-type charging apparatus to remove noise components. The Y-capacitor provided at the output terminal is usually made to have a larger capacitance than that of the Y-capacitor provided at the input terminal.

Meanwhile, the AC power provided by the charging equipment outside the vehicle may be symmetric or asymmetric depending on the type of charging equipment or the type of power supply network in a provided country. When the AC power is asymmetric, a common-mode component exists. This common-mode component acts as low-frequency (frequency of system power) noise, and can generate a leakage current flowing to the ground through the Y-capacitor of the output terminal with a large capacitance.

When the DC-DC converter included in the vehicle-mounted-type charging apparatus is of an insulated type having a transformer (transformer), since the input and output terminals of the DC-DC converter are isolated from each other, the Y-capacitor on the output terminal side is not affected by system power input to the vehicle-mounted charging apparatus. However, when the DC-DC converter included in the vehicle-mounted-type charging apparatus is of a non-insulated type, since an electrical connection path is formed between the input and output terminals of the DC-DC converter, a common-mode component of input system power acts as low-frequency (frequency of system power) noise, and generates a leakage current flowing to the ground through the Y-capacitor of the output terminal with a large capacitance.

As described above, since the Y-capacitor connected to the output terminal of the vehicle-mounted-type charging apparatus has a much larger capacitance than that of the Y-capacitor connected to the input terminal thereof, the low-frequency leakage current due to most common modes is concentrated at the Y-capacitor of the output terminal.

The external charging equipment that provides system power to the vehicle includes a residual current detection (RCD) device that cuts off system power provided for safety if the leakage current increases above a certain level. If the current leaked to the Y-capacitor provided at the output terminal of the vehicle-mounted-type charging apparatus is equal to or greater than a reference detection level set by the RCD device, the RCD device may stop the supply of system power to thus stop charging of a battery in the vehicle, whereby the battery cannot be charged to a desired level by a driver.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a charging apparatus configured for reducing the generation of a low-frequency leakage current due to a common-mode component included in an asymmetric AC power source.

The present invention aims to provide a charging apparatus configured for reducing a low-frequency leakage current due to a common-mode component included in various types of AC system power regardless of the type of an AC power source.

In accordance with an aspect of the present invention, a charging apparatus configured for reducing a low-frequency leakage current may include: a power factor correction (PFC) converter configured to include a switching element, to correct a power factor of AC power provided by external charging equipment through ON/OFF control of the switching element, to convert the corrected power factor into DC power, and to output the DC power; a DC link capacitor configured to be connected to both ends of the PFC converter to form a DC voltage; a DC-DC converter configured to convert a magnitude of the DC voltage formed by the DC link capacitor into a magnitude of a voltage required by an energy storage device to be charged; and a duty controller configured to determine a duty of the switching element in the PFC converter based on a magnitude of a common-mode component of an AC voltage of the AC power provided by the external charging equipment and the magnitude of the DC voltage formed by the DC link capacitor.

In an exemplary embodiment of the present invention, the duty controller may include: a basic duty generation unit, configured to determine a first duty value for controlling the switching element so that the PFC converter outputs a voltage of a predetermined magnitude; and a multiplier, configured to calculate a second duty value by dividing the magnitude of the common-mode component of the AC voltage of the AC power by the magnitude of the DC voltage formed by the DC link capacitor, and wherein a value obtained by adding the second duty value to each of the first duty value and a value complementary to the first duty value is provided as a duty value for performing the ON/OFF control of the switching element.

In an exemplary embodiment of the present invention, the PFC converter may include: a first leg configured to have a first switching element and a second switching element directly connected to each other; and a second leg configured to have a third switching element and a fourth switching element directly connected to each other, and wherein the first leg and the second leg are connected in parallel to each other between two input terminals of input terminals of the DC-DC converter, one terminal of input terminals to which the AC power is provided is connected to a connection node of the first switching element and the second switching element, and the other terminal of the input terminals to which the AC power is provided is connected to a connection node of the third switching element and the fourth switching element.

In an exemplary embodiment of the present invention, the duty controller may provide a value obtained by adding the second duty value to the first duty value as a duty value for performing ON/OFF control of the first switching element, may provide a value complementary to the value obtained by adding the second duty value to the first duty value as a duty value for performing ON/OFF control of the second switching element, may provide a value obtained by adding the second duty value to the value complementary to the first duty value as a duty value for performing ON/OFF control of the third switching element, and may provide a value complementary to the value obtained by adding the second duty value to the value complementary to the first duty value as a duty value for performing ON/OFF control of the fourth switching element.

In an exemplary embodiment of the present invention, the DC-DC converter may be of a non-insulated type.

In an exemplary embodiment of the present invention, the charging apparatus may further include: two input terminal Y-capacitors configured to be connected in series to each other between input terminals to which the AC power is input, wherein a connection node of the two input terminal Y-capacitors is grounded.

In an exemplary embodiment of the present invention, the duty controller may include: a basic duty generation unit configured to determine a first duty value for controlling the switching element so that the PFC converter outputs a voltage of a predetermined magnitude; a subtractor configured to subtract ½ of the AC voltage of the AC power from the voltage of one of the input terminal Y-capacitors; and a multiplier configured to calculate a second duty value by dividing an operation result of the subtractor by the magnitude of the DC voltage formed by the DC link capacitor, wherein a value obtained by adding the second duty value to each of the first duty value and a value complementary to the first duty value is provided as a duty value for performing the ON/OFF control of the switching element.

In an exemplary embodiment of the present invention, the PFC converter may include: a first leg configured to have a first switching element and a second switching element directly connected to each other; and a second leg configured to have a third switching element and a fourth switching element directly connected to each other, and wherein the first leg and the second leg are connected in parallel to each other between two input terminals of input terminals of the DC-DC converter, one terminal of input terminals to which the AC power is provided is connected to a connection node of the first switching element and the second switching element, and the other terminal of the input terminals to which the AC power is provided is connected to a connection node of the third switching element and the fourth switching element.

In an exemplary embodiment of the present invention, the duty controller may provide a value obtained by adding the second duty value to the first duty value as a duty value for performing ON/OFF control of the first switching element, may provide a value complementary to the value obtained by adding the second duty value to the first duty value as a duty value for performing ON/OFF control of the second switching element, may provide a value obtained by adding the second duty value to the value complementary to the first duty value as a duty value for performing ON/OFF control of the third switching element, and may provide a value complementary to the value obtained by adding the second duty value to the value complementary to the first duty value as a duty value for performing ON/OFF control of the fourth switching element.

In accordance with an aspect of the present invention, a charging apparatus configured for reducing a low-frequency leakage current may include: a filter configured to include two input terminal Y-capacitors connected in series to each other between input terminals to which AC power provided by external charging equipment is input, wherein a connection node of the two input terminal Y-capacitors is grounded; a PFC converter configured to include a switching element, to correct a power factor of the AC power, to convert the corrected power factor into DC power, and to output the DC power; a DC link capacitor configured to be connected to both ends of the PFC converter to form a DC voltage; a DC-DC converter configured to convert a magnitude of the DC voltage formed by the DC link capacitor into a magnitude of a voltage required by an energy storage device to be charged; and a duty controller configured to determine a duty of the switching element in the PFC converter based on a magnitude of a common-mode component of an AC voltage of the AC power, which is derived by subtracting ½ of the AC voltage of the AC power from a voltage of one of the input terminal Y-capacitors, and the magnitude of the DC voltage formed by the DC link capacitor.

As described above, the charging apparatus configured for reducing the low-frequency leakage current can reduce a low-frequency leakage current due to a common-mode component of an asymmetric DC power source generated in the charging apparatus. Therefore, according to the charging apparatus configured for reducing the low-frequency leakage current, the leakage current may be reduced below a detection level of a residual current detection (RCD) device provided in charging equipment, preventing a charging stoppage phenomenon from occurring.

In particular, according to the charging apparatus configured for reducing the low-frequency leakage current, it is possible to reduce the low-frequency leakage current due to the common-mode component included in various types of AC system power regardless of the type of the AC power source. Therefore, the structure of a controller for reducing the leakage current may be simplified, and it is not necessary to determine the polarity of a charging plug, so that it is unnecessary to make a determination as to the orientation of the charging plug at the time of insertion thereof, increasing the convenience of a driver.

The effects obtained as an exemplary embodiment of the present invention are not limited to the effects mentioned above, and other effects not mentioned may be clearly understood by those skilled in the art from the following description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a charging apparatus configured for reducing a low-frequency leakage current according to various embodiments will be described in detail with reference to the accompanying drawings.

Figure 1:
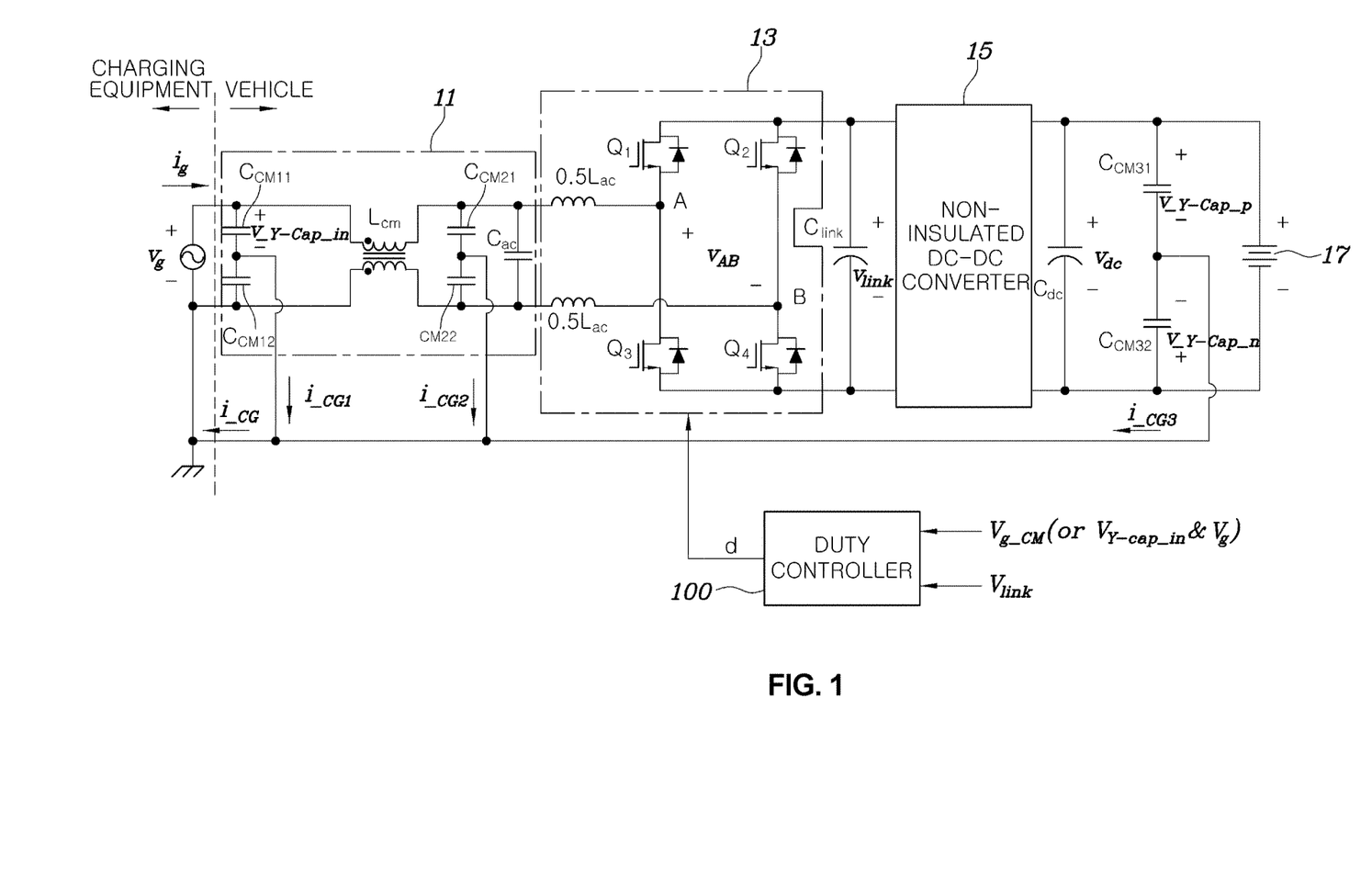
FIG. 1 is a circuit diagram illustrating a charging apparatus configured for reducing a low-frequency leakage current according to an exemplary embodiment of the present invention.

FIG. 1 is a circuit diagram illustrating a charging apparatus configured for reducing a low-frequency leakage current according to an exemplary embodiment of the present invention.

Referring to FIG. 1, the charging apparatus configured for reducing the low-frequency leakage current according to an exemplary embodiment of the present invention may include a filter 11 configured to remove high-frequency noise of AC power ($v_g$, $i_g$) input from external charging equipment, a power factor correction (PFC) converter 13, a DC link capacitor $C_{link}$ configured to form a DC voltage at the output terminal of the PFC converter 13, a DC-DC converter 15 configured to convert a level of a voltage $v_{link}$ of the DC link capacitor $C_{link}$ to a charging voltage level for charging a battery 17, output terminal Y-capacitors $C_{CM31}$ and $C_{CM32}$ connected to the output terminal of the DC-DC converter 15, and a duty controller 100.

The filter 11 includes two Y-capacitors $C_{CM11}$ and $C_{CM12}$, connected in series between input terminals to which an AC voltage of the external charging equipment is applied, as elements for removing a high-frequency noise component contained in the power provided by the external charging equipment. A connection node of the two Y-capacitors $C_{CM11}$ and $C_{CM12}$ may be grounded.

In FIG. 1, the filter 11 may include additional input terminal Y-capacitors Cam and $C_{CM22}$ connected between two inductors $L_{CM}$ and two inductors $L_{CM}$, which form a transformer, but such a structure may be changed as needed.

The PFC converter 13 receives AC power (system power) $v_g$ input from the outside, converts the received AC power into DC power to output the DC power, and corrects the power factor of the AC power. The PFC converter 13 may be implemented using a system-connected inverter topology having a plurality of switching elements $Q_1$ to $Q_4$.

The PFC converter 13 includes a first leg, including a first switching element $Q_1$ and a second switching element $Q_2$ directly connected to each other, and a second leg, including a third switching element $Q_3$ and a fourth switching element $Q_3$ directly connected to each other. The first leg and the second leg may be connected in parallel to each other between two input terminals of the DC-DC converter 15. That is, the first switching element $Q_1$ and the second switching element $Q_2$ may be sequentially connected in series between the positive (+) terminal and the negative (−) terminal of the output terminals of the PFC converter 13, and the third switching element $Q_3$ and the fourth switching element $Q_4$ may be sequentially connected in series between the positive (+) terminal and the negative (−) terminal of the output terminals of the PFC converter 13.

Furthermore, the PFC converter 13 includes a first inductor $L_{ac1}$, respective ends of which are connected to one end of the input AC power and a connection node A of the first switching element $Q_1$ and the second switching device $Q_2$, and a second inductor $L_{ac2}$, respective ends of which are connected to the other end of the input AC power and a connection node B of the third switching element $Q_3$ and the fourth switching device $Q_4$. The first and second inductors $L_{ac1}$ and $L_{ac2}$ may be applied for a filter.

The ON/OFF state of the switching elements $Q_1$ to $Q_4$ of the PFC converter 13 may be controlled by a duty value determined by a duty controller 100, which will be described later.

AC power filtered by the filter 11 may be input to the input terminal of the PFC converter 13. The AC power may have a symmetric or asymmetric structure for a provided country or a provided specification of the charging equipment. AC power provided in a symmetric structure has no common-mode component, but single-phase AC power provided in an asymmetric structure may be variously changed depending on the type or the providing structure thereof. This will be described later.

The PFC converter 13 may include the first inductor $L_{ac1}$, connected between the connection node of the first switching element $Q_1$ and the second switching element $Q_2$ and one (positive (+) terminal) of the output terminals of the filter 11, and the second inductor $L_{ac2}$, connected between the connection node of the third switching element $Q_3$ and the fourth switching element $Q_4$ and a remaining one (negative (−) terminal) of the output terminals of the filter 11.

The PFC converter 13 converts AC power input from an AC power source into DC power and outputs the DC power, and the DC link capacitor $C_{link}$, both ends of which are connected to respective terminals of the output terminals of the PFC converter 13, is charged by the power output from the PFC converter 13 to form a DC link voltage $v_{link}$ of a predetermined magnitude.

The DC-DC converter 15 may convert the DC voltage $v_{link}$ of the DC link capacitor $C_{link}$ connected to the two output terminals of the PFC converter 13 into a DC voltage of a desired magnitude and may output the DC voltage. Since the present invention relates to a charging apparatus that generates DC power for charging the battery 17 or the like of the vehicle, the DC-DC converter 15 may be controlled to output voltage of a magnitude sufficient to charge the battery 17.

Since the present invention is provided to reduce the low-frequency leakage current due to the common-mode component of the AC power source through the Y-capacitors $C_{CM31}$ and $C_{CM32}$ provided at the output terminals of the charging apparatus, in the various embodiments of the present invention, the DC-DC converter 15 may be a converter having a non-insulated type structure in which the common-mode component of the AC power source may be transmitted to the output terminal.

The non-insulated DC-DC converter applied in various embodiments of the present invention may employ various structures known in the art, and the control technique of the DC-DC converter is also well-known in the art, and thus an additional description of the DC-DC converter 15 will be omitted.

One ends of the first and second output terminal Y-capacitors $C_{CM31}$ and $C_{CM32}$ may be respectively connected to the positive (+) terminal and the negative (−) terminal of the output terminals (that is, output terminals of the charging apparatus) of the DC-DC converter 15, and the other ends thereof may be commonly connected to the ground (chassis ground in the case of a vehicle).

In the case of the vehicle-charging apparatus, since the first and second output terminal Y-capacitors $C_{CM31}$ and $C_{CM32}$ provided at the output terminal of the charging apparatus may have a much larger capacitance than that of the input terminal Y-capacitors $C_{CM11}$ and $C_{CM12}$, $C_{CM21}$ and $C_{CM22}$ included in the filter 11 of the charging apparatus, a large part of a low-frequency leakage current $i_{CG}$ due to the common-mode component flows to the ground through the first and second output terminal Y-capacitors $C_{CM31}$ and $C_{CM32}$. According to various embodiments of the present invention, the duty of the switching element in the PFC converter 13 is appropriately controlled, as described later, to reduce the low-frequency leakage current $i_{CG}$ flowing to the ground through the first and second Y-capacitors $C_{CM31}$ and $C_{CM32}$.

Figure 2:
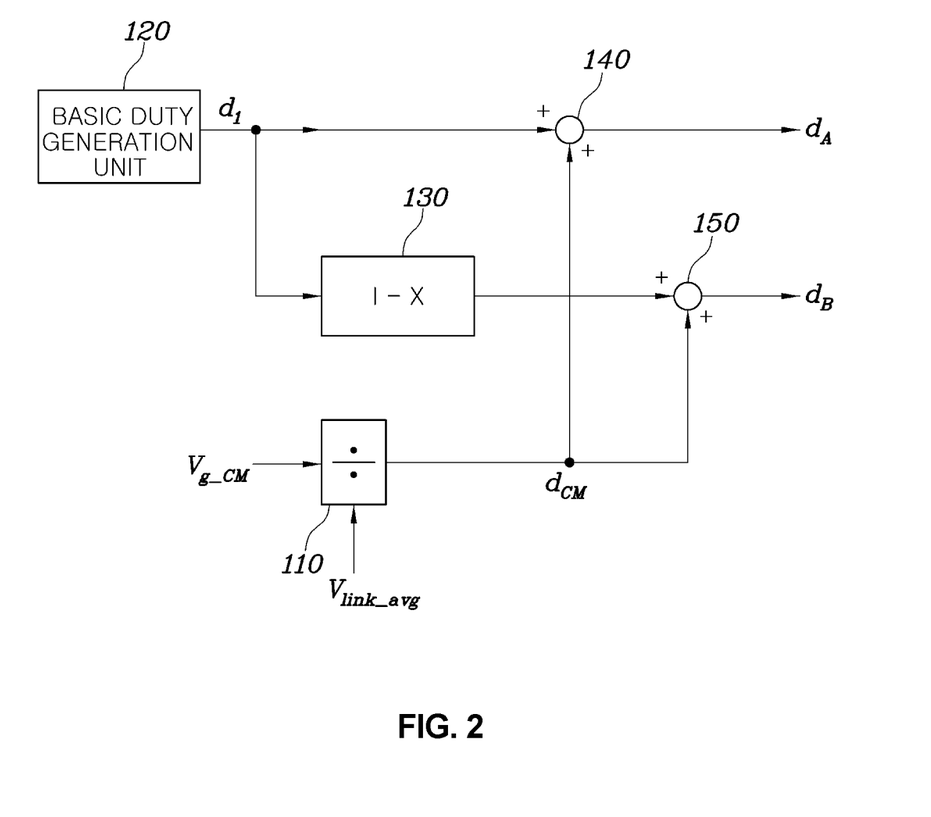
FIG. 2 is a block diagram illustrating an example of a duty controller of a charging apparatus configured for reducing a low-frequency leakage current according to an exemplary embodiment of the present invention, in more detail.

FIG. 2 is a block diagram illustrating, in more detail, an example of a duty controller of a charging apparatus configured for reducing a low-frequency leakage current according to an exemplary embodiment of the present invention.

A basic duty generation unit 120 in the duty controller 100 may determine and output a duty value $d_1$ that can control the switching elements $Q_1$ to $Q_4$ so that the PFC converter 13 outputs a voltage of a predetermined magnitude. That is, the basic duty generation unit 120 may determine first duty values $d_1$ of the switching elements $Q_1$ to $Q_4$ in the PFC converter 13 so that the magnitude of the DC link voltage $v_{link}$ may be a predetermined voltage.

The basic duty generation unit 120 may compare the DC link voltage $V_{link}$ with the predetermined voltage to generate a reference current value for causing the DC link voltage $v_{link}$ to follow the predetermined voltage, may compare a value obtained by performing DQ-transform on an input current based on phase information related to an input voltage with the reference current value to generate a DQ-axis voltage control value for causing the input current to follow the reference current value, and may then perform inverse DQ transform on the DQ-axis voltage control value to generate the first duty value $d_1$. Since the technique of generating the first duty value $d_1$ by the basic duty generation unit 120 is a well-known technique applied to a PFC control structure to which the inverter topology is applied, a detailed description thereof will be omitted.

Furthermore, the duty controller 100 may include a multiplier 110 that divides a common-mode component $v_{g\_CM}$ of an AC voltage $v_g$ of the AC power supplied from the external charging equipment by the DC link voltage $v_{link}$. A value obtained by dividing the common-mode component $v_{g\_CM}$ of the AC voltage $v_g$ by the DC link voltage $v_{link}$ generates a second duty $d_{CM}$ configured for removing a leakage current due to the common mode.

Figure 3:
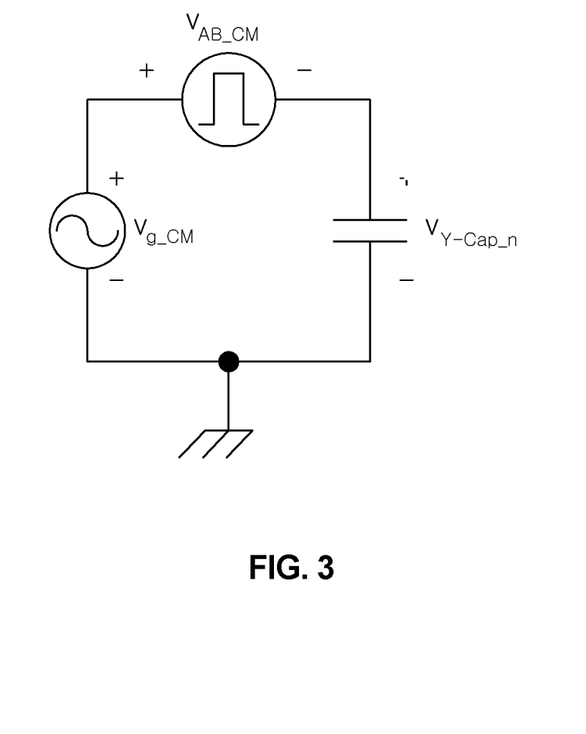
FIG. 3 is an equivalent circuit diagram illustrating a connection relationship between a common-mode component and a Y-capacitor of a charging apparatus configured for reducing a low-frequency leakage current according to an exemplary embodiment of the present invention.

FIG. 3 is an equivalent circuit diagram illustrating a connection relationship between a common-mode component and a Y-capacitor of a charging apparatus configured for reducing a low-frequency leakage current according to an exemplary embodiment of the present invention.

In FIG. 3, a voltage indicated by "$v_{AB\_CM}$" is a common-mode component of a voltage $v_{AB}$ formed between a connection node one of the first switching element $Q_1$ and the second switching element $Q_2$, which form the first leg of the PFC converter 13, and a connection node B of the third switching element $Q_3$ and the fourth switching device $Q_4$, which form the second leg thereof.

The equivalent circuit diagram illustrated in FIG. 3 is an equivalent circuit diagram implemented only with a portion related to the low-frequency common-mode component in the circuit illustrated in FIG. 1. In the circuit of FIG. 1, the inductor $L_{ac}$ has a low impedance with respect to a low frequency component, so that the low frequency component is negligible. The non-insulated DC-DC converter 15 transmits a low-frequency common-mode component to the output terminal, so that the low-frequency common-mode component is negligible. Furthermore, when the equivalent circuit is interpreted in the case of the Y-capacitor of the output terminal, it is easy to interpret the equivalent circuit based on a DC cathode (−) line, so that it is appropriate to express a low-frequency common-mode path through the second Y-capacitor $C_{CM32}$. Considering the above-described facts in FIG. 1, an equivalent circuit diagram related to the common-mode component $v_{AB\_CM}$ may be derived as shown in FIG. 3.

As illustrated in FIG. 3, when the common-mode component $v_{AB\_CM}$ of the voltage between the node A and the node B is controlled, the leakage current due to the common-mode component $v_{g\_CM}$ of the AC power source flowing into the Y-capacitor (second Y-capacitor $C_{CM32}$ in FIG. 2) may be adjusted. Here, the voltage between the node A and the node B may be determined by controlling ON/OFF duty values of the switching elements $Q_1$ to $Q_4$ by applying the system-connected inverter topology.

That is, to reduce the low-frequency leakage current of the Y-capacitors $C_{CM31}$ and $C_{CM32}$ due to the common-mode component of the AC power source, the ON/OFF duty values of the switching elements $Q_1$ to $Q_4$ are controlled so that the common-mode component $v_{g\_CM}$ of the AC power source may be canceled by the common-mode component $v_{AB\_CM}$ of the voltage between the node A and the node B. This is the same as determining the ON/OFF duty values of the switching elements $Q_1$ to $Q_4$ for converting the voltages of the Y-capacitors $C_{CM31}$ and $C_{CM32}$ into DC.

Meanwhile, since the Y-capacitors $C_{CM31}$ and $C_{CM32}$ have substantially infinite impedance with respect to a DC component, the DC component of the current $i_{CG}$ flowing to the ground through the Y-capacitors $C_{CM31}$ and $C_{CM32}$ is negligible.

Accordingly, the DC component of the common-mode component voltage $v_{AB\_CM}$ between the node A and the node B illustrated in FIG. 3 is negligible, and only the AC component is controlled to be the same as the common-mode component $v_{g\_CM}$ of the system power source, removing the low-frequency leakage current caused by the common-mode component.

To the present end, in an exemplary embodiment of the present invention, the common-mode component $v_{g\_CM}$ of the AC voltage $v_g$ of the AC power is divided by the DC link voltage $v_{link}$ to generate a second duty value $d_{CM}$, and the generated second duty value is added to the first duty value $d_1$, controlling the switching elements $Q_1$ to $Q_4$ of the PFC converter 13.

$$v_{Y\text{-}cap\_p} = v_{bat} - \alpha v_{link} \quad \text{[Equation 1]}$$

In Equation 1, $v_{y\text{-}cap\_p}$ denotes the voltage of the Y-capacitor $C_{CM31}$ connected to the positive (+) terminal of the output terminal of the DC-DC converter 15, $v_{bat}$ denotes the voltage of an energy storage device connected to the output terminal of the DC-DC converter 15, and $v_{link}$ denotes a DC link voltage at the input terminal of the DC-DC converter 15. Furthermore, α may be an arbitrary constant determined between 0 and 1, preferably a value adjacent to 0.5, and more preferably 0.5.

According to Equation 1, the magnitude of the voltage of the Y-capacitor $C_{CM32}$ connected to the negative (-) terminal of the output terminal of the DC-DC converter 15 is always $-\alpha v_{link}$.

The DC component of the common-mode component voltage $v_{AB\_CM}$ between the node A and the node B becomes half (0.5 $v_{link}$) of the DC link voltage $v_{link}$, and according to Equation 1, the magnitude of the voltage of the Y-capacitor $C_{CM32}$ is always $-\alpha v_{link}$. That is, considering FIG. 3 and Equation 1, when "α=0.5" is satisfied, regardless of whether the DC-DC converter 15 is in an up-down state, it is possible to generate a second duty value $d_{CM}$ that can remove the common-mode component by adjusting only the AC component of the common-mode component voltage $V_{AB\_CM}$ between the node A and the node B without considering the DC component.

Since the voltage of each of the nodes A and B is determined by a switching element duty $d_A$ or $d_B$ of each leg ($V_A = d_A V_{link}$, $V_B = d_B V_{link}$), the common-mode component voltage $V_{AB\_CM}$ between the node A and the node B may be determined as shown in the following Equation 2.

$$V_{AB\_CM} = 0.5(V_A + V_B) = 0.5(d_A + d_B) V_{link} \quad \text{[Equation 2]}$$

Furthermore, referring to the equivalent circuit of FIG. 3, if the common-mode component voltage of the AC power source is equal to the sum of the magnitude of the common-mode component voltage $v_{AB\_CM}$ between the node A and the node B and the magnitude of the voltage of the Y-capacitor $C_{CM32}$, the leakage current may be removed. Thus, when, particularly, the voltage of the Y-capacitor $C_{CM32}$ is $-0.5 v_{link}$, a DC offset component may not be considered, so that the following Equation 3 may be derived.

$$V_{g\_CM} = V_{AB\_CM} + V_{Y\text{-}cap\_n} = 0.5(d_A + d_B) V_{link} - 0.5 V_{link} \quad \text{[Equation 3]}$$

Meanwhile, the switching element duty $d_A$ or $d_B$ of each leg includes an offset value of 0.5 since it is determined based on duties determined to have complementary values with respect to 0.5. That is, the sum of the duties that control the switching elements of each leg may be determined to always be 1 based on a basic duty (e.g., first duty generated by the basic duty generation unit 120 in FIG. 7) for generating the switching element duty $d_A$ or $d_B$ of each leg. Accordingly, based on this, when subtracting 0.5 from a value obtained by dividing the sum of the generated switching element duties $d_A$ and $d_B$ of each leg by 0.5, the duty $d_{CM}$ corresponding to the common-mode component may be obtained. This is represented by Equation 4.

$$d_{CM} = 0.5(d_A + d_B) - 0.5 \quad \text{[Equation 4]}$$

According to Equations 3 and 4, the duty corresponding to the common-mode component may be obtained as shown in Equation 5 below.

$$d_{CM} = \frac{V_{g\_CM}}{V_{link}} \quad \text{[Equation 5]}$$

That is, when dividing the common-mode component $v_{g\_CM}$ of the AC voltage $v_g$ by the voltage of a DC link terminal to which the PFC converter 13 and the DC-DC converter 15 are connected, a duty for controlling the common-mode component may be derived.

Here, the common-mode component $v_{g\_CM}$ of the AC voltage $v_g$ may be theoretically determined by detecting an input voltage according to the type of AC power source. A method of obtaining the common-mode component of the AC voltage for each type of AC power source will be described with reference to FIG. 4, FIG. 5 and FIG. 6 to be described later.

Furthermore, the duty controller 100 may include a complementary value calculator 130 configured to calculate a value complementary to the first duty $d_1$, generated by the basic duty generation unit 120, that is, a value obtained by subtracting the first duty from "1"; a first summer 140, configured to generate a duty $d_A$ for controlling the first switching element $Q_1$ of the PFC converter 13 by adding the second duty $d_{CM}$ to the first duty $d_1$; and a second summer 150, configured to generate a duty $d_B$ for controlling the second switching element $Q_2$ by adding the second duty $d_{CM}$ to a value output from the complementary value calculator 130. Since the third switching element $Q_3$ included in the same leg as the first switching element $Q_1$ is turned ON/OFF in a complementary relationship with the first switching element $Q_1$, the third switching element $Q_3$ may be controlled with a duty of "$1-d_A$". Since the fourth switching element $Q_4$ included in the same leg as the second switching element $Q_2$ is turned ON/OFF in a complementary relationship with the second switching element $Q_2$, the fourth switching element $Q_4$ may be controlled with a duty of "$1-d_B$".

As described above, according to an exemplary embodiment of the present invention, it is possible to reduce the low-frequency leakage current generated by the common-mode component of the AC power input to the charging apparatus through the duty control of the PFC converter. Accordingly, a charging apparatus configured for reducing the low-frequency leakage current according to various embodiments of the present invention may reduce the leakage current to less than the detection level of the RCD provided in the charging equipment, preventing a charging stoppage phenomenon from occurring.

Figure 4:
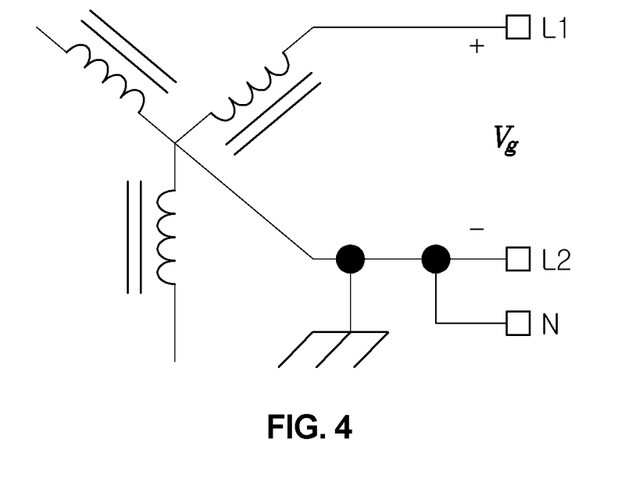
FIG. 4, FIG. 5 and FIG. 6 are diagrams illustrating various types of AC system power supply structures of an external charging apparatus.
Figure 5:
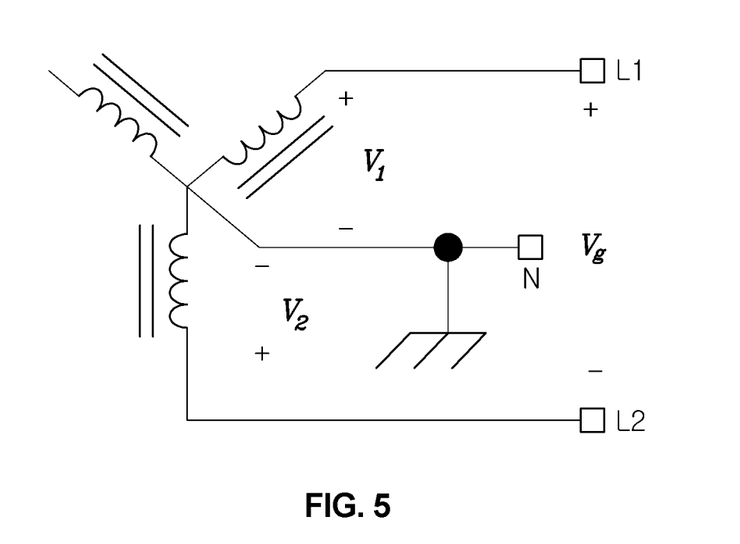
Figure 6:
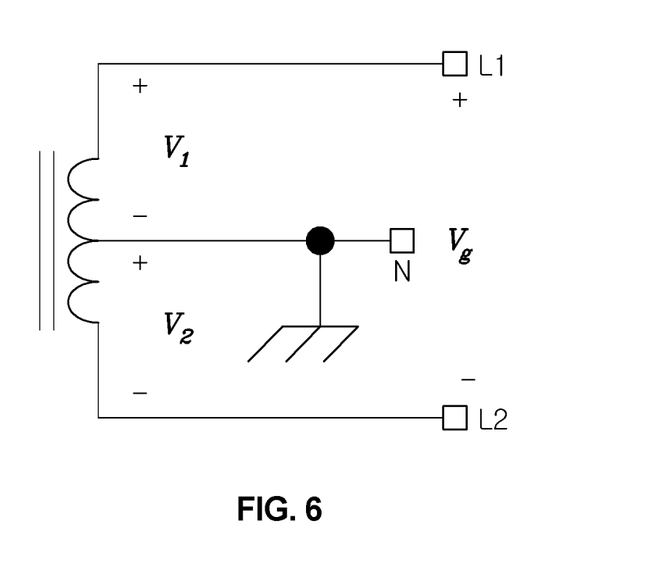

FIG. 4, FIG. 5 and FIG. 6 are diagrams illustrating various types of AC system power supply structures of an external charging apparatus.

FIG. 4 shows an AC power supply structure of a cable control box (ICCB) of the type used in South Korea, Europe, and North America. FIG. 4 shows an asymmetric structure for supplying an AC voltage between one of three phases and a neutral point which is grounded. In the system power source structure shown in FIG. 4, ½ of the supplied AC power $v_g$ may be a common-mode component. In particular, in the system structure of FIG. 4, $-½$ of the AC power $v_g$ may be the common-mode component when a wire connection between two lines L1 and L2 and the input terminal of the vehicle-mounted-type charging apparatus is reversed.

FIG. 5 shows one of the system structures applied in North America, and shows an asymmetric structure in which a voltage between two lines of different phases is provided as the AC voltage $v_g$ and a neutral point between the two lines forms the ground. In the structure shown in FIG. 5, when a phase angle difference of the two lines is +120 degrees or −120 degrees, different common-mode components are exhibited.

FIG. 6 shows a symmetric structure applied in electric vehicle supply equipment (EVSE) in North America. In the instant case, the common-mode component becomes zero.

In the system power supply structure shown in FIG. 4, FIG. 5 and FIG. 6, the common mode may be expressed as an average of the voltage magnitudes between each of two terminals of the input terminal to which the AC voltage $v_g$ is input and the ground, that is, ½.

In particular, in the case in which there are the Y-capacitors $C_{CM11}$ and $C_{CM12}$ connected to the input terminal in the above-described filter 11, when the voltage applied to one Y-capacitor $C_{CM11}$ is detected, the common-mode component of the AC voltage may be defined by the following equation.

$$v_{g\_CM} = 0.5[v_{Y\text{-}Cap\_in} + \{-(v_g - v_{Y\text{-}Cap\_in})\}] = v_{Y\text{-}Cap\_in} - 0.5 v_g \quad \text{[Equation 6]}$$

Figure 7:
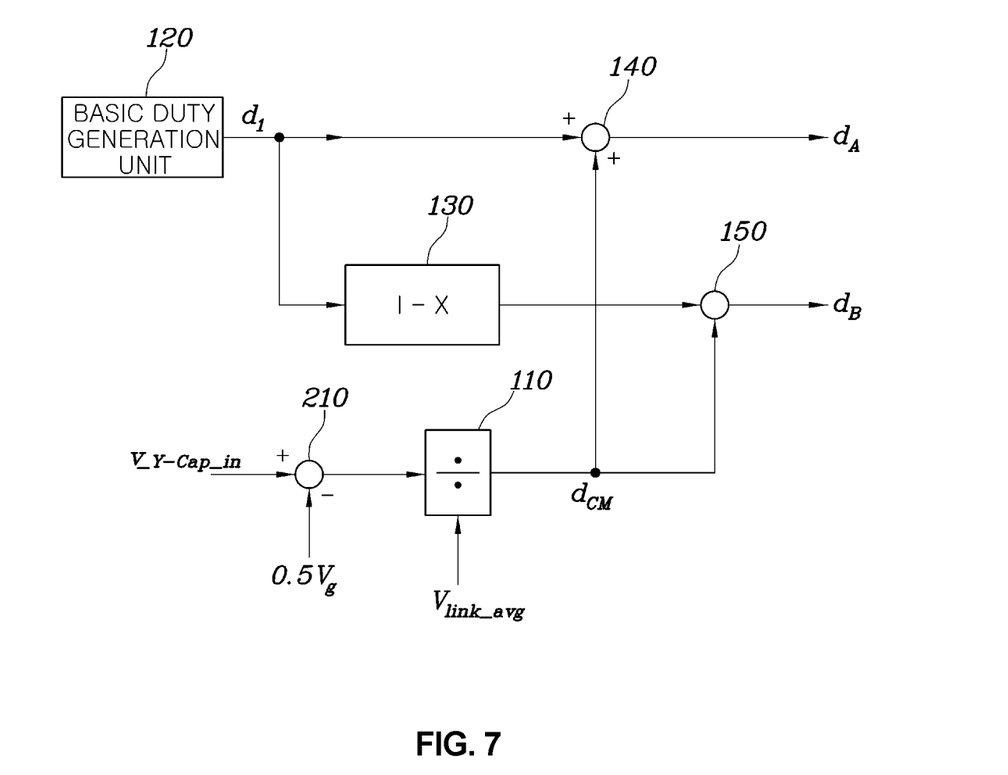
FIG. 7 is a block diagram illustrating another example of a duty controller of a charging apparatus configured for reducing a low-frequency leakage current according to an exemplary embodiment of the present invention in more detail.

Therefore, when the duty controller is configured to obtain the common-mode component of the input AC voltage of FIG. 2 using Equation 6, it may be as shown in FIG. 7.

FIG. 7 is a block diagram illustrating another example of a duty controller of a charging apparatus configured for reducing a low-frequency leakage current according to an exemplary embodiment of the present invention in more detail.

Referring to FIG. 7, the duty controller may include a subtractor 210 for subtracting a value obtained by detecting the input AC voltage $v_g$ from a value $V_{Y\text{-}Cap\_in}$ obtained by detecting the voltage value of one capacitor Cam of the input side Y-capacitors included in the filter 11. The final result of the subtraction operation of the subtractor 210 represents the common-mode component $v_{g\_CM}$ of the input AC voltage. The second duty value $d_{CM}$ is calculated by dividing the value obtained through the above-described subtraction operation by the DC link voltage $v_{link}$, and then ON/OFF control of the switching elements $Q_1$ to $Q_4$ of the PFC converter 13 may be performed through the same operation as in the example of FIG. 2.

As described above, according to an exemplary embodiment of the present invention, the common-mode component of the input AC power may be easily reduced using an easily detectable value such as the Y-capacitor voltage on the input side of the charging apparatus and the input AC voltage. In particular, by use of the Y-capacitor voltage on the input side of the charging apparatus and the input AC voltage, it is possible to simplify the structure of the controller for reducing the leakage current, and it is not necessary to determine the polarity of the charging plug, so that it is unnecessary to make a determination as to the direction at the time of inserting the charging plug, increasing the convenience of a driver.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A charging apparatus of reducing a low-frequency leakage current, the charging apparatus comprising:
    a power factor correction (PFC) converter including a switching element, and configured to correct a power factor of AC power provided by external charging equipment through ON/OFF control of the switching element, to convert the corrected power factor into DC power, and to output the DC power;
    a DC link capacitor connected to a first end and a second end of the PFC converter to form a DC voltage;
    a DC-DC converter connected to the DC link capacitor and configured to convert a magnitude of the DC voltage formed by the DC link capacitor into a magnitude of a voltage required by an energy storage device to be charged; and
    a duty controller configured to determine a duty of the switching element in the PFC converter based on a magnitude of a common-mode component of an AC voltage of the AC power provided by the external charging equipment and the magnitude of the DC voltage formed by the DC link capacitor,
    wherein the duty controller includes:
        a basic duty generation unit configured to determine a first duty value for controlling the switching element so that the PFC converter outputs a voltage of a predetermined magnitude; and
        a multiplier configured to determine a second duty value by dividing the magnitude of the common-mode component of the AC voltage of the AC power by the magnitude of the DC voltage formed by the DC link capacitor,
    wherein a value obtained by adding the second duty value to each of the first duty value and a value complementary to the first duty value is provided as a duty value for performing the ON/OFF control of the switching element.

2. The charging apparatus of claim 1,
wherein the switching element includes a first switching element, a second switching element, a third switching element, and a fourth switching element, and
wherein the PFC converter includes:
- a first leg configured to have the first switching element and the second switching element directly connected to each other; and
- a second leg configured to have the third switching element and the fourth switching element directly connected to each other,
- wherein the first leg and the second leg are connected in parallel to each other between first and second input terminals of the DC-DC converter, the first terminal to which the AC power is provided is connected to a first connection node of the first switching element and the second switching element, and the second terminal to which the AC power is provided is connected to a second connection node of the third switching element and the fourth switching element.

3. The charging apparatus of claim 2, wherein the duty controller is configured to:
- provide a value obtained by adding the second duty value to the first duty value as a duty value for performing ON/OFF control of the first switching element,
- provide a value complementary to the value obtained by adding the second duty value to the first duty value as a duty value for performing ON/OFF control of the second switching element,
- provide a value obtained by adding the second duty value to the value complementary to the first duty value as a duty value for performing ON/OFF control of the third switching element, and
- provide a value complementary to the value obtained by adding the second duty value to the value complementary to the first duty value as a duty value for performing ON/OFF control of the fourth switching element.

4. The charging apparatus of claim 1,
wherein the DC-DC converter is of a non-insulated type.

5. The charging apparatus of claim 1, further including:
two input terminal Y-capacitors configured to be connected in series to each other between input terminals to which the AC power is input,
wherein a connection node of the two input terminal Y-capacitors is grounded.

6. The charging apparatus of claim 5,
wherein the duty controller includes:
- a basic duty generation unit configured to determine a first duty value for controlling the switching element so that the PFC converter outputs a voltage of a predetermined magnitude;
- a subtractor configured to subtract ½ of the AC voltage of the AC power from a voltage of one of the input terminal Y-capacitors; and
- a multiplier configured to determine a second duty value by dividing an operation result of the subtractor by the magnitude of the DC voltage formed by the DC link capacitor, and
wherein a value obtained by adding the second duty value to each of the first duty value and a value complementary to the first duty value is provided as a duty value for performing the ON/OFF control of the switching element.

7. The charging apparatus of claim 6,
wherein the switching element includes a first switching element, a second switching element, a third switching element, and a fourth switching element, and
wherein the PFC converter includes:
- a first leg configured to have the first switching element and the second switching element directly connected to each other; and
- a second leg configured to have the third switching element and the fourth switching element directly connected to each other, and
wherein the first leg and the second leg are connected in parallel to each other between first and second input terminals of the DC-DC converter, the first terminal to which the AC power is provided is connected to a first connection node of the first switching element and the second switching element, and the second terminal to which the AC power is provided is connected to a second connection node of the third switching element and the fourth switching element.

8. The charging apparatus of claim 7, wherein the duty controller is configured to:
- provide a value obtained by adding the second duty value to the first duty value as a duty value for performing ON/OFF control of the first switching element,
- provide a value complementary to the value obtained by adding the second duty value to the first duty value as a duty value for performing ON/OFF control of the second switching element,
- provide a value obtained by adding the second duty value to the value complementary to the first duty value as a duty value for performing ON/OFF control of the third switching element, and
- provide a value complementary to the value obtained by adding the second duty value to the value complementary to the first duty value as a duty value for performing ON/OFF control of the fourth switching element.

9. A charging apparatus configured for reducing a low-frequency leakage current, the charging apparatus comprising:
- a filter including two input terminal Y-capacitors connected in series to each other between input terminals to which AC power provided by external charging equipment is input, wherein a connection node of the two input terminal Y-capacitors is grounded;
- a PFC converter including a switching element, to correct a power factor of the AC power, to convert the corrected power factor into DC power, and to output the DC power;
- a DC link capacitor connected to a first end and a second end of the PFC converter to form a DC voltage;
- a DC-DC converter configured to convert a magnitude of the DC voltage formed by the DC link capacitor into a magnitude of a voltage required by an energy storage device to be charged; and
- a duty controller configured to determine a duty of the switching element in the PFC converter based on a magnitude of a common-mode component of an AC voltage of the AC power, which is derived by subtracting ½ of the AC voltage of the AC power from a voltage of one of the input terminal Y-capacitors, and the magnitude of the DC voltage formed by the DC link capacitor,
wherein the switching element includes a first switching element, a second switching element, a third switching element, and a fourth switching element, and wherein the PFC converter includes:
- a first leg configured to have the first switching element and the second switching element directly connected to each other; and
- a second leg configured to have the third switching element and the fourth switching element directly connected to each other, wherein the first leg and the second leg are connected in parallel to each other between first and second input terminals of the DC-DC converter, the first terminal to which the AC power is provided is connected to a first connection node of the first switching element and the second switching element, and the second terminal to which the AC power is provided is connected to a second connection node of the third switching element and the fourth switching element.

* * * * *